United States Patent [19]
Gilbert et al.

[11] Patent Number: 5,999,818
[45] Date of Patent: *Dec. 7, 1999

[54] FREQUENCY RE-USED AND TIME-SHARED CELLULAR COMMUNICATION SYSTEM HAVING MULTIPLE RADIO COMMUNICATION SYSTEMS

[75] Inventors: Sheldon L. Gilbert, San Diego; F. Matthew Rhodes, Encinitas, both of Calif.; Francis James Canova, Jr., Boynton Beach, Fla.

[73] Assignee: Cirrus Logic, Inc., Fremont, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/692,678

[22] Filed: Aug. 6, 1996

[51] Int. Cl.[6] ....................................................... H04J 3/16
[52] U.S. Cl. ........................... 455/448; 455/447; 455/450; 455/426; 370/330
[58] Field of Search ..................................... 455/449, 450, 455/454, 446, 447, 448, 62, 509, 513, 437, 524, 561, 562, 426; 370/436, 431, 442, 329, 330, 336, 337, 458, 280; 375/202

[56] References Cited

U.S. PATENT DOCUMENTS

| | | | |
|---|---|---|---|
| 5,185,739 | 2/1993 | Spear | 455/447 |
| 5,193,091 | 3/1993 | Crisler et al. | 455/450 |
| 5,228,029 | 7/1993 | Kotzin | 455/437 |
| 5,408,495 | 4/1995 | Kotzin et al. | 375/202 |
| 5,408,496 | 4/1995 | Ritz et al. | 455/447 |
| 5,581,548 | 12/1996 | Ugland et al. | 370/330 |
| 5,633,873 | 5/1997 | Kay et al. | 455/450 |

*Primary Examiner*—Reinhard J. Eisenzopf
*Assistant Examiner*—Lester G. Kincaid
*Attorney, Agent, or Firm*—Blakely, Sokoloff, Taylor & Zafman LLP; Steven Shaw

[57] ABSTRACT

A method and apparatus for multiplexing time-shared base stations between a plurality of radio communication systems in a cellular communication system. Each radio communication system in the cellular system is assigned a limited unique set of frequencies for communication therein. Base stations in the cellular system are synchronized to a common time base and frequency reuse is achieved by time-sharing the frequencies via allocated time slots. Base stations activated to communicate in a first radio communication system and using the same frequencies that may interfere with each other are activated in the first system only during selected time intervals while same-frequency base stations nearby are deactivated in the first system. The deactivated base stations are then in turn activated in the first system while previously activated same-frequency base stations nearby are deactivated. Enhanced base station efficiency is achieved using the present inventive method by activating the time sharing base stations to communicate in one or more additional radio communication systems during periods when the base stations are deactivated in the first system. The radio communication systems can use differing numbers of assigned frequencies having differing time slot durations. The transmission periods used by each system may be mutually exclusive, or may overlap.

22 Claims, 9 Drawing Sheets

BASE
STATION

BASE
STATION

FREQUENCY RE-USED AND TIME-SHARED CELLULAR COMMUNICATION SYSTEM HAVING MULTIPLE RADIO COMMUNICATION SYSTEMS

CROSS REFERENCE TO RELATED APPLICATION

This application is related to commonly assigned co-pending application, U.S. Ser. No. 08/533,664, filed Sep. 25, 1995, entitled "Time Sharing Method and Apparatus for Frequency Reuse in Cellular Communication Systems," herein incorporated by reference.

BACKGROUND OF THE INVENTION

1. Field of the Invention

This invention relates to wireless communication systems, and more particularly to cellular communication systems.

2. Description of Related Art

Mobile radio communication systems generally comprise two components: fixed base stations and radio system users (fixed or mobile). The fixed base stations provide an interface between the radio system users and users of other wired or wireless systems. The base stations typically are geographically deployed to optimize service for the system users throughout a service area. A base station's coverage area is defined as a composite of all locations in which a system user can communicate with the base station. The coverage area is limited both by distances and obstacles (natural and man-made) which inhibit the propagation of radio signals transceived by a base station. Fixed base stations are typically deployed so that the composite of their respective coverage areas define a desired service area for a given system.

Adjacent base stations often have overlapping coverage areas. Consequently, users of adjacent base stations often will interfere with each other when they attempt to concurrently transceive different information using the identical frequency channels. Some prior art radio communication systems, referred to as "simulcast" or "broadcast" systems, solve this interference problem by forcing every fixed base station to transmit the identical information using identical frequency channels. Thus, rather than interfere with each other, the prior art simulcast base stations tend to reinforce each other. Under many topographical conditions, transmissions received from several simulcast base stations have improved signal strengths as compared to transmissions received from a single base station. Consequently, the prior art simulcast systems are able to transmit signals into areas that suffer from large transmission path losses.

Disadvantageously, the prior art simulcast systems have relatively low net data transmissions rates. The capacity of the prior art simulcast systems is limited because a plurality of base stations are used to transmit identical information. For example, in some prior art simulcast paging systems the total bit rate supportable for an entire metropolitan area is typically only 2,400 bits per second (bps). Such limited capacity has heretofore been adequate for supporting numeric paging messages in which messages primarily comprise a single telephone number. However, new services such as alphanumeric paging (where messages comprise a large number of text characters) require increased system capacity. Consequently, many simulcast paging systems are approaching capacity and cannot support such services.

A more common means for avoiding interference between adjacent base stations is to assign different frequencies to each base station and allow them to transceive different information. This approach is used in the prior art cellular communication systems. In contrast to the prior art simulcast paging systems, each base station in a cellular paging system transmits different streams of information using different frequencies. Thus, cellular systems are being developed to overcome the shortcomings of the prior art simulcast systems. For example, Narrowband Personal Communications Systems (or "NPCS") are being developed to provide a new class of messaging services and instrumentation having improved efficiency and greater functionality in comparison with the prior art messaging or paging systems. One example of a presently contemplated NPCS system is described in the personal Air Communication Technology (pACT) system specification, release 1.1, hereinbelow referred to as the "pACT specification", distributed by the American Telephone and Telegraph (AT&T) Wireless Services company.

Although the new cellular messaging and paging systems promise increased capacity and a wider range of services than has previously been available, they typically are deployed in environments where the available frequency spectrum is quite limited. For example, the pACT specification contemplates deployment scenarios where a typical system is allocated merely two or three frequency channels for forward link transmissions (transmissions from base stations to subscriber units). As described in a related patent application (commonly assigned co-pending application, U.S. Ser. No. 08/533,664, hereinafter referred to as "the related application"), when all frequencies allocated to a system have been used it is necessary to begin reusing the frequencies. The frequency reuse process requires careful assignment of frequencies to base stations and radio communication service areas. This assignment process is referred to as "frequency planning" or "cell planning."

FIG. 1 is a block diagram of a prior art cell configuration showing the problems associated with frequency reuse and frequency planning. Clusters of seven cells (modeled as hexagons for ease of understanding) form "cell groups" or "frequency reuse groups" 1, indicated by bold lines. In the example shown, seven frequencies are used within each cell group 1, and then reused in adjacent cell groups 1. Within each cell group 1, the pattern of frequency distribution is normally the same. Thus, the center cell 2a of the central cell group 1a shown uses the same frequency as the center cell 2b of the adjacent cell group 1b. Because the number of available frequencies is often limited the exercise of defining which frequencies are used by which base station has become increasingly complex.

Because frequencies are reused, two cells or base stations operating on the same frequency, though separated geographically, may interfere with each other. This is known as "co-channel interference." In many cases path loss conditions may cause the difference between the desired carrier power and the interference (known as the ratio "C/I") to be insufficient for reliable receiver performance. The overall effect of co-channel interference is to create areas within a cell where no good coverage is possible. In the case of seven total frequencies, these bad locations may comprise 40% or more of a typical cell. The traditional way to mitigate co-channel interference in FDMA systems is to allocate a larger number of frequencies to the service and to devise sparse reuse patterns. However, this method cannot be used when only a small number of frequencies, such as three, are available.

As described in the related application, an alternative method of solving the problems associated with co-channel interference in systems having only a small number of frequencies is to time-share the available frequencies between base stations. Frequency reuse is enhanced by synchronizing cell transmit/receive base stations in a cellular system to a common time base, and then sharing the available frequencies via allocated time slots. That is, cells or base stations using the same frequency that potentially interfere with each other are activated only during selected time intervals while same-frequency cells nearby are deactivated. The deactivated cells are then in turn activated while previously activated same-frequency cells nearby are deactivated. Thus, frequency planning is simplified in systems that do not otherwise have a sufficient number of unique frequencies to provide adequate spatial separation between same frequency base stations.

As taught in the related application, a number of different time slot allocation schemes may be used. For example, FIG. 2 is a timing diagram showing equal time slot allocations between two potentially interfering cells or base stations. The horizontal dimension represents time. In the example shown, a first potentially interfering base station X is activated during a first time period Ta, while a second potentially interfering base station Y is de-activated during the same first time period Ta. In a second time period Tb, the first base station X is de-activated while the second base station Y is activated. In a third time period Ta', the base stations reverse state again, as in the first time period Ta, and so forth in the fourth time period Tb'. FIG. 3 is a timing diagram showing equal time slot allocations among three potentially interfering base stations X, Y, and Z during cyclical time periods Ta, Tb, and Tc. Although only a 3-time slot cycle is shown, 4 or 5 or more time slots could be used, with "extra" time slots being allocated to one or more of the base stations based on relative usage among the base stations. Alternatively, the durations of time slots Ta, Tb, and Tc can vary based on relative usage.

Disadvantageously, one artifact of time-sharing base stations in the manner shown in FIGS. 2–3 is that each base station is allowed to transmit on an assigned frequency only during designated time periods. Consequently, the base stations are idle a significant percentage of the time. For example, the base stations of FIG. 2 are idle 50% of the time, while those of FIG. 3 are idle 66% of the time. Considering the expense associated with the purchase, deployment and maintenance of cellular systems, idle base stations represent undesirable overhead costs to system providers. Therefore, it is desirable to provide a time-shared cellular communication system which uses a small number of frequencies, substantially reduces significant co-channel interference, yet which provides efficient use of otherwise "idle" time-shared base stations. The present invention provides such a cellular communication system by sharing the "idle" time-shared base stations between two or more radio communication systems.

SUMMARY OF THE INVENTION

The present invention is a method and apparatus for sharing time-shared base stations between two or more radio communication systems. In accordance with the preferred embodiment of the present invention, during time slots when time-shared base stations are otherwise "idle" on a first radio communication system (i.e., during time slots when the time-shared base stations are not allowed to transmit on their assigned frequencies of a first communication system), the base stations are allowed to transmit on assigned frequencies of a second radio communication system. An alternative embodiment allows the otherwise idle base stations to transmit on assigned frequencies of two or more additional radio communication systems.

The present invention also allows time-shared base stations to operate on radio communication systems having differing numbers of allocated frequencies and differing time slot durations. The time slots contemplated for use with the present time-sharing/system-sharing invention may be of equal length. Alternatively, longer time slot durations may be allocated to cells having higher usage rates, as determined in a number of ways. The transmission periods used by each system may be mutually exclusive, or may overlap. The only requirement of the radio communication systems designed for use with the present invention is that the systems use "compatible" frequency plans.

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 2 is a timing diagram showing equal time slot allocations between two potentially interfering base stations.

FIG. 3 is a timing diagram showing equal time slot allocations among three potentially interfering base stations.

Like reference numbers and designations in the various drawings indicate like elements.

DETAILED DESCRIPTION OF THE INVENTION

Throughout this description, the preferred embodiment and examples shown should be considered as exemplars, rather than as limitations of the present invention.

The present invention is contemplated for use in a time-shared cellular radio communication system. The present invention allows time-shared base stations to be used concurrently by a plurality of radio communication systems. The invention is particularly useful in two-way cellular paging systems, although it may be used with any data communication system where co-channel interference and limited frequency spectrum is a problem.

One preferred embodiment of the present invention enhances the efficiency of base stations using the time slot allocations described above with reference to FIGS. 2 and 3 and made in accordance with the related application. In accordance with the preferred embodiment described hereinbelow, the time-shared base stations of a first radio communication system are allowed to transmit in one or more additional radio communication systems during the time periods that the base stations are otherwise idle (i.e., not allowed to transmit) in the first radio communication system. For example, assume that both a first and a second radio communication system are deployed to cover the same service area. Assume further that the two systems operate using different sets of frequencies. A time-shared base station that is idle 50% of the time in the first communication system can be used to transmit on a frequency that is assigned to the second communication system during the periods that it is otherwise idle in the first system. Because this base station is otherwise idle in the first system 50% of the time, it is available to transmit in the second system without degrading the performance of the first system. Similarly, base stations that are idle in the second system are available for transmission on a frequency assigned to the first system without degrading the performance of the second system.

As described above with reference to FIGS. 2–3, a time-shared base station is periodically inhibited from transmitting on a frequency assigned to it by a first communication system because it would thereby potentially interfere with nearby base stations assigned the same frequency. However, the time-shared base station may periodically transmit using one or more different frequencies that are unique to one or more different radio communication systems, respectively, without interfering with nearby base stations of the first communication system. Consider, for example, the system using the time slot allocations shown in FIG. 4.

Figure 1:
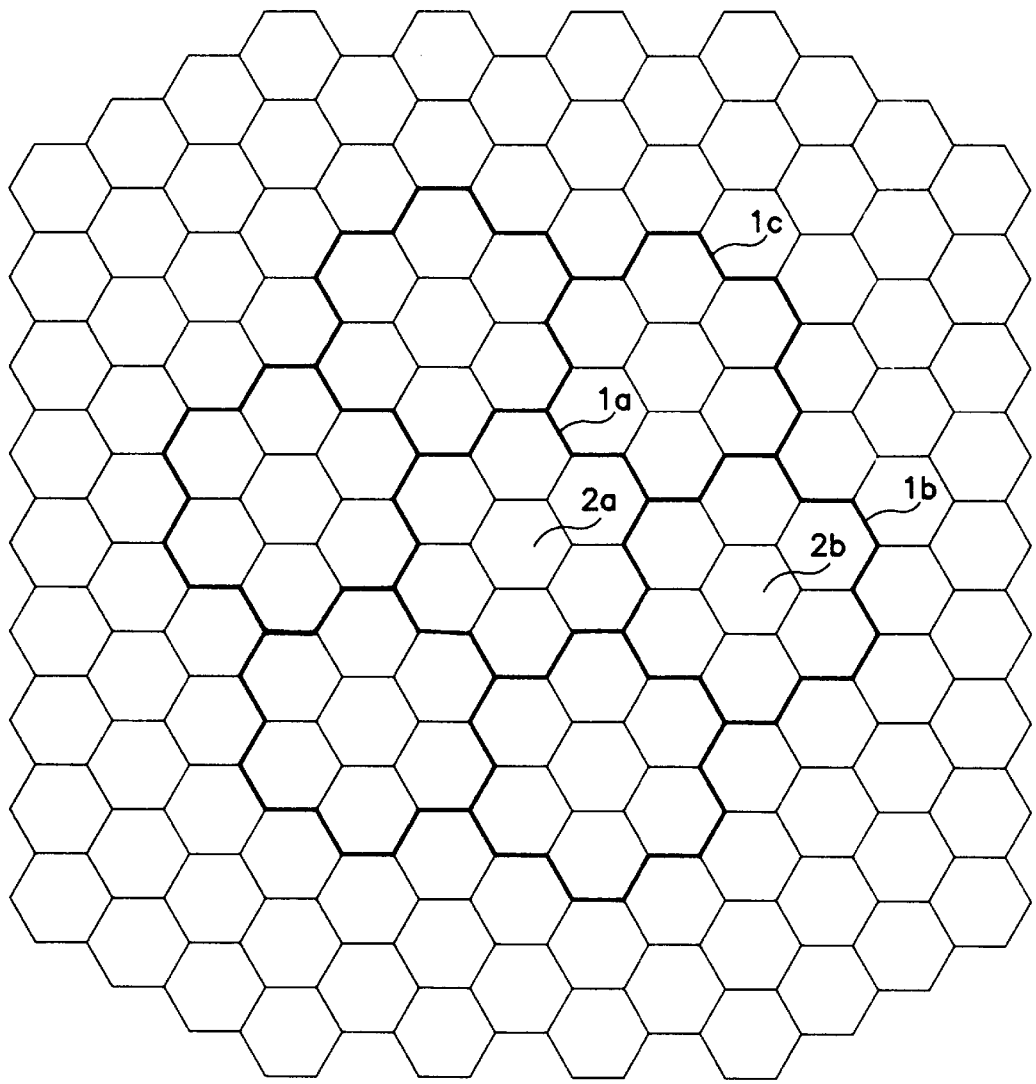
FIG. 1 is a block diagram of a prior art cell configuration showing the problem of frequency reuse.
Figure 4:
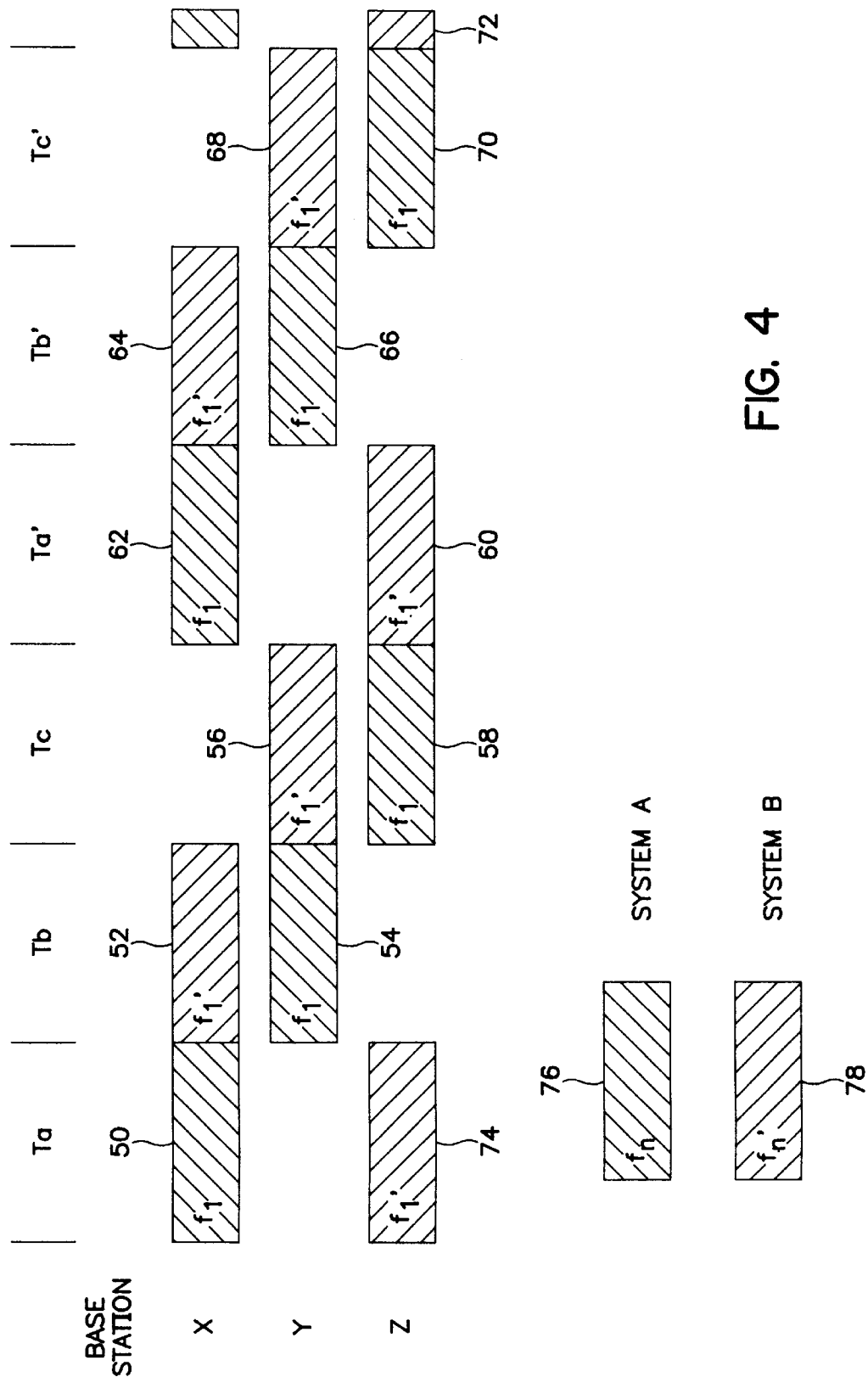
FIG. 4 is a timing diagram showing equal time slot allocations between three potentially interfering base stations using the radio communication system sharing techniques of the present invention.

FIG. 4 is a timing diagram showing equal time slot allocations among three potentially interfering base stations of a cell group, X, Y, and Z during three cyclical time periods Ta, Tb, and Tc. The horizontal dimension represents time. The base stations having the time slot allocations of FIG. 4 are similar to those described above with reference to FIG. 3. However, the base stations of FIG. 4 have been modified to periodically transmit in two radio communication systems: namely, in System A and System B. As shown in FIG. 4, System A uses an assigned frequency $f_n$ 76, while System B uses an assigned frequency $f_n'$ 78. The two frequencies $f_n$ 76 and $f_n'$ 78 are distinct from one another. In the example shown, $f_n$ 76 is equal to $f_1$, and $f_n'$ is equal to $f_1'$.

Similar to the system of FIG. 3, the system of FIG. 4 has a first potentially co-channel interfering base station X which is activated to transmit on frequency $f_1$ 50 in System A during a first time period Ta, and second and third potentially interfering base stations (Y and Z respectively) which are de-activated in System A during the same first time period Ta. Similarly, in a second time period Tb, the first base station X and the third base station Z are de-activated in System A while the second base station Y is activated to transmit on an assigned frequency $f_1$ 54 in System A. In a third time period Tc, the first base station X and the second base station Y are de-activated in System A while the third base station Z is activated to transmit on an assigned frequency $f_1$ 58 in System A. As in the system of FIG. 3, in a fourth time period Ta', the base stations reverse state again, as in the first time period Ta, and so forth in the fifth time period Tb'.

In accordance with the present invention the base stations are periodically activated to transmit on frequency $f_1'$ in System B during the periods that the base stations are de-activated in System A. For example, as shown in FIG. 4, the first potentially interfering base station X is activated to transmit on frequency $f_1'$ 52 in System B during the time period Tb, the second base station Y is activated to transmit on its assigned frequency $f_1$, 56 in System B during the time period Tc, and the third base station Z is activated to transmit on its assigned frequency $f_1'$ 74 in System B during the time period Ta. As before, in the time period Ta' the base stations reverse state again, as in the first time period Ta, and so forth in the time period Tb'. As shown in FIG. 4, no two base stations within a cell group are allowed to simultaneously transmit using the same frequency.

Figure 5:
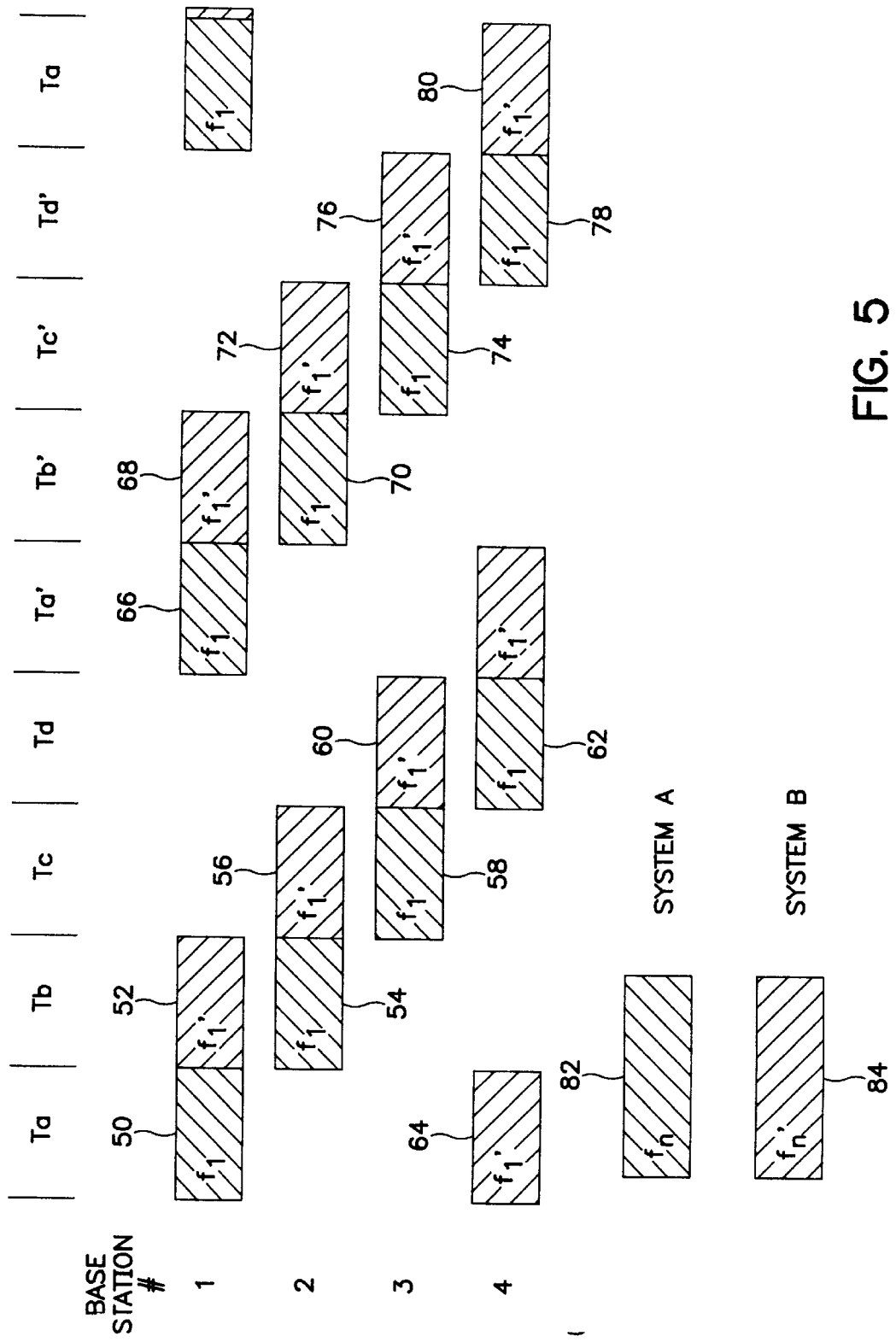
FIG. 5 is a timing diagram showing equal time slot allocations between four potentially interfering base stations during four cyclical time periods using the radio system sharing techniques of the present invention.

FIG. 5 is a timing diagram showing equal time slot allocations among four potentially interfering base stations of a cell group during four cyclical time periods Ta, Tb, Te, and Td. Once again, the horizontal dimension represents time. As shown in FIG. 5, System A uses an assigned frequency $f_n$, 82, and System B uses an assigned frequency $f_n'$ 84. Similar to the two assigned system frequencies of FIG. 4, the two assigned system frequencies $f_n$ 82 and $f_n'$ 84 are distinct from one another.

As shown in FIG. 5, in accordance with the present invention, the base stations are periodically activated to transmit on frequency $f_1'$ in System B during the time periods that the base stations are de-activated or idle in System A. For example, a first potentially interfering base station is activated to transmit on frequency $f_1'$ 52 in System B during the time period Tb, a second base station is activated to transmit on its assigned frequency $f_1'$ 56 in System B during the time period Tc, a third base station is activated to transmit on its assigned frequency $f_1'$ 60 in System B during the time period Td, and a fourth base station is activated to transmit on its assigned frequency $f_1'$ 64 in System B during the time period Ta. In the time period Ta', the base stations reverse state again, as in the time period Ta, and so forth in the next time period Tb'. No two base stations within a cell group are allowed to simultaneously transmit using the same frequency.

Although the timing diagrams of FIGS. 4 and 5 contemplate base stations that are time-multiplexed between at least two radio communication systems, the present invention can also be deployed in systems wherein each base station is dedicated to a unique system. Thus, using the novel system-sharing and time-sharing technique, some installations will use base stations that are shared between multiple radio communication systems while other installations will use base stations that are separately installed for and used by only one radio communication system. Whether a base station is shared by several systems or dedicated to a single system, the present invention requires that all system base stations be time synchronized and configured to transmit in accordance to a defined system time slot allocation scheme.

The present invention can be used with existing subscriber equipment for use by mobile users. Mobile users of communication systems made in accordance with the present invention cannot discern any difference between a base station serving multiple systems (i.e., a time-shared/ system-shared base station made in accordance with the present invention) and a dedicated base station serving only one system. Rather, a mobile user can only observe transmissions generated by base stations on the frequencies assigned to the mobile user's system. Transmissions generated by base stations on frequencies assigned to different systems than that used by the mobile user are undetected by the mobile user. Consequently, the time-sharing and system-sharing technique of the present invention does not impact the design or operation of existing mobile user subscriber equipment.

FIGS. 4 and 5 show time slot allocations for systems having "complimentary" frequency planning schemes. Frequency planning schemes are complimentary when each system uses the same number of corresponding frequencies (e.g., $f_n$ and $f_n'$) and each system uses transmission periods of equal duration. As described in more detail hereinbelow, the present invention does not require systems to use complimentary frequency planning schemes. Rather, the present inventive method can be used in systems having differing numbers of assigned frequencies and differing transmission period durations. The only requirement of the present invention is that the multiple systems use "compatible" frequency plans. Systems are considered compatible if their frequency plans do not require that a given base station transmit in both systems simultaneously. Stated another way, the frequency plans of two systems are compatible if the frequency plan of a first system does not require that a base station transmit in the first system at the same time the frequency plan of the second system requires that the base station transmit in the second system. To be compatible, the first system may only require that the base station transmit in its system during a period, or a portion of a period, during which the base station is de-activated, or idle, in the second system.

Figure 6:
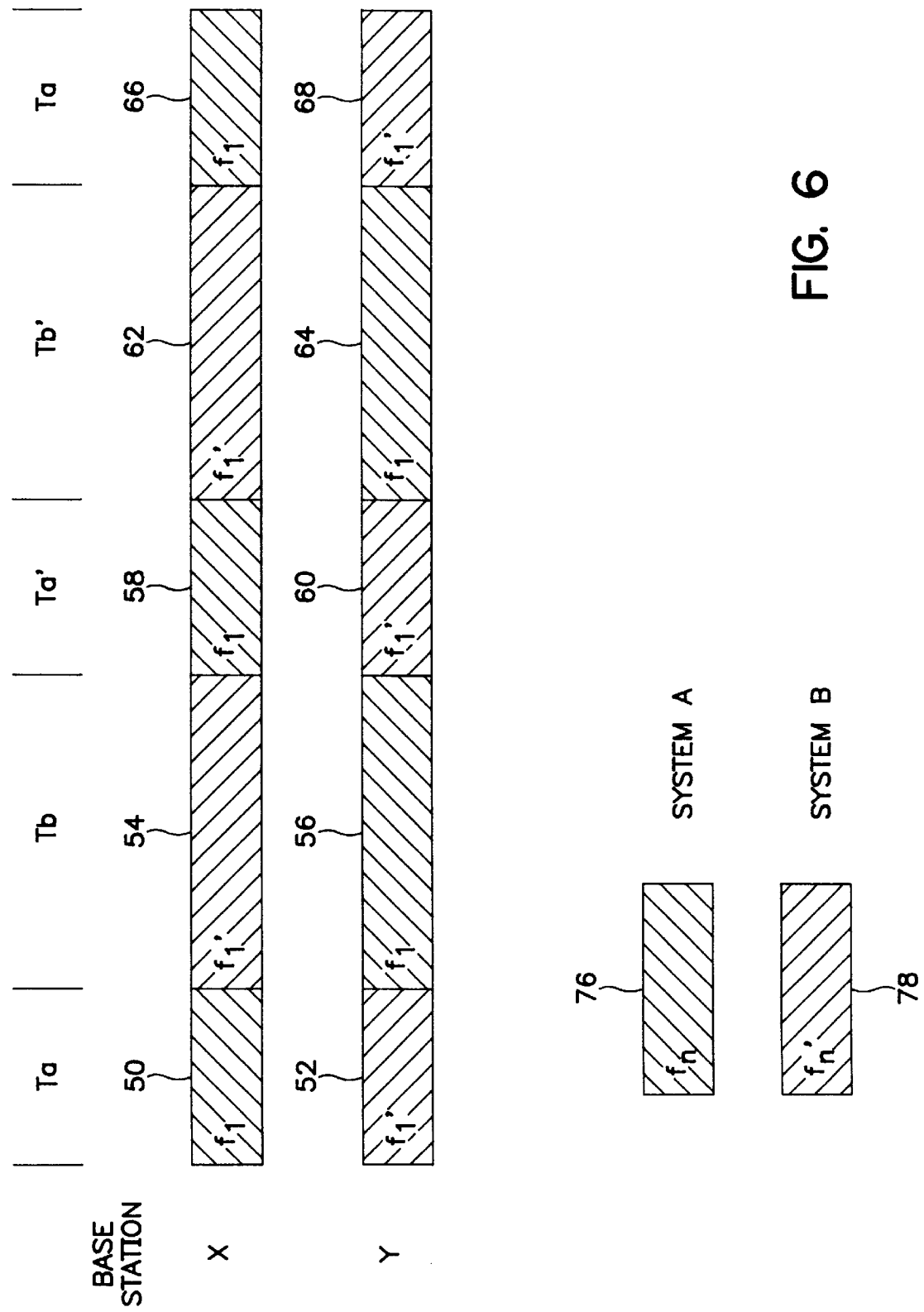
FIG. 6 is a timing diagram showing unequal time slot allocations between two potentially interfering base stations using the system sharing techniques of the present invention.

FIG. 6 is a timing diagram showing an example of unequal time slot allocations between two potentially interfering base stations X and Y in accordance with the novel technique of the present invention. Similar to the base stations shown in FIGS. 4 and 5, the base stations of FIG. 6 are time-multiplexed between two systems, System A and System B. As shown in FIG. 6, System A uses an assigned frequency $f_n$ and System B uses an assigned frequency $f_n'$. The two frequencies $f_n$ and $f_n'$ are distinct from one another.

Similar to the system using the time slot allocations of FIG. 4, the system of FIG. 6 has a first potentially interfering base station X which is activated to transmit on frequency $f_1$ 50 in System A during a first time period Ta, and a second potentially interfering base station Y which is de-activated in System A during the same first time period Ta. In a second time period Tb, the first base station X is de-activated in System A while the second base station Y is activated to transmit on an assigned frequency $f_1$ 56 in System A. In a third time period Ta', the base stations reverse state again, as in the first time period Ta, and so forth in the fourth time period Tb'. In accordance with the present invention the base stations are periodically activated to transmit on frequency $f_1'$ in System B during the periods that the base stations are de-activated in System A.

One method of insuring compatibility between varying system frequency plans is to force each system to use complimentary frequency plans wherein the transmissions are offset from each other both in time and frequency. An example of such a complimentary frequency plan is described above with reference to FIG. 5. The time slot allocation shown in FIG. 5 can be expanded to include a greater number of base stations and a greater number of frequencies assigned to each radio communication system.

Figure 7:
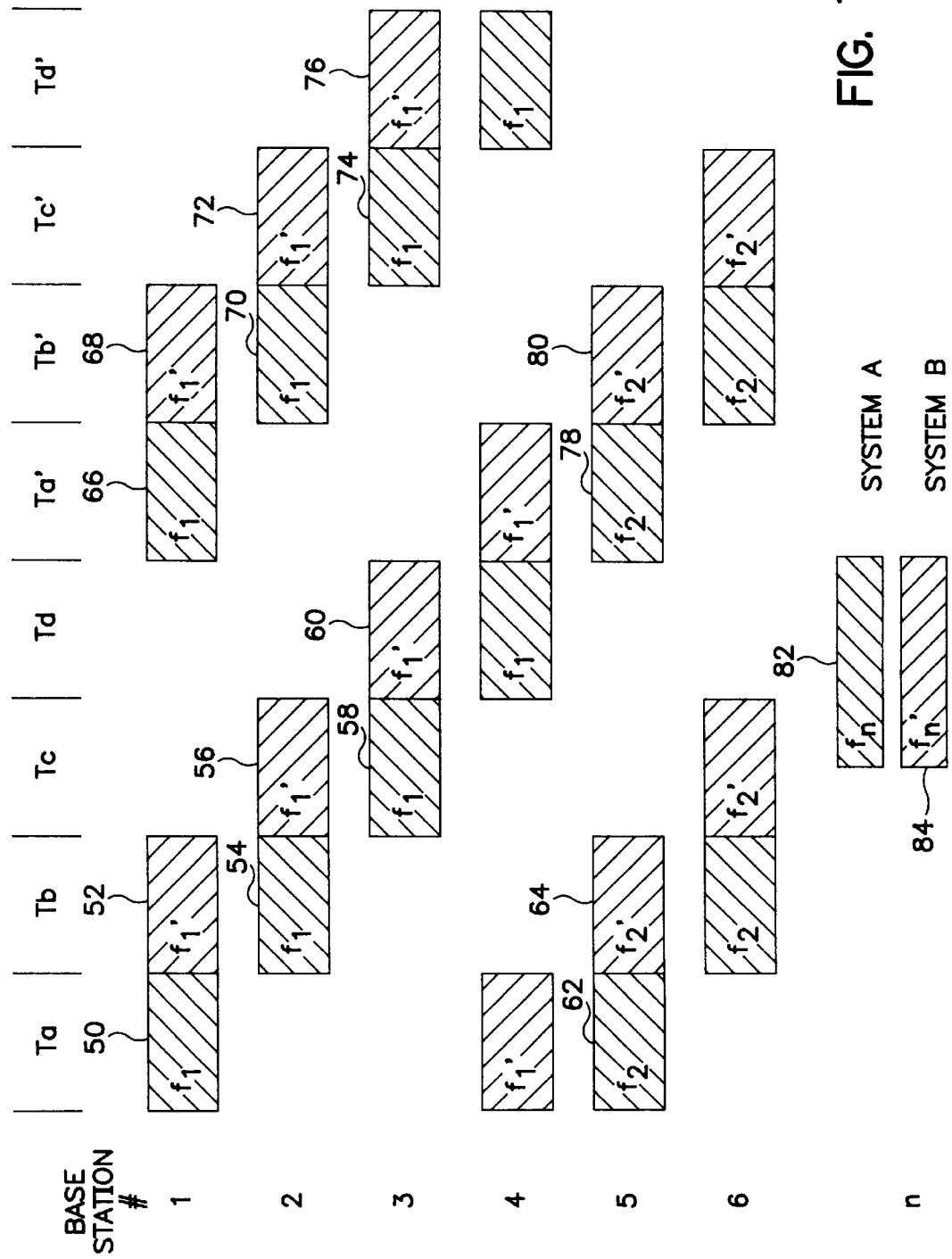
FIG. 7 is a timing diagram showing equal time slot allocations between n potentially interfering base stations during four cyclical time periods using the radio system sharing techniques of the present invention.

For example, the timing diagram shown in FIG. 7 uses at least two frequencies per communication system, wherein the frequencies are time-shared between n base stations. A time-sharing factor of four is used to create four time periods, Ta, Tb, Tc, and Td. As described above with reference to FIGS. 4–6, the base stations are time-shared between two compatible systems, specifically, System A and System B. In the example shown in FIG. 7, each system uses at least two distinct frequencies ($f_1$ and $f_2$, and $f_1'$ and $f_2'$, respectively) assigned thereto. Each frequency of a first system has a corresponding, yet distinct, frequency assigned to a second system. In addition, the transmission periods for activation and de-activation of base station transmissions in each system are aligned in time.

A base station that transmits on frequency $f_1$ in a first system during one time period is allowed to transmit on a corresponding frequency $f_1'$ in a second system during the next time period (i.e., base stations 1–4 in FIG. 7). Similarly, a base station that transmits on frequency $f_2$ in a first system during one time period is allowed to transmit on a corresponding frequency $f_2'$ in a second system during the next time period (i.e., base stations 5–8 in FIG. 7). Each base station similarly transmits on corresponding frequencies of the two systems during subsequent time periods as shown in FIG. 7. More corresponding frequencies can be added to the time slot allocation shown as the number of base stations utilized by the compatible systems increases. For example, corresponding frequencies $f_3$ and $f_4'$ can be added to System A and System B respectively if the number of base stations utilized exceeds eight). There is no theoretical limit to the number of corresponding frequencies $f_n$ (for System A) and $f_n'$ (for System B) that can be used in practicing the present invention.

Figure 8:
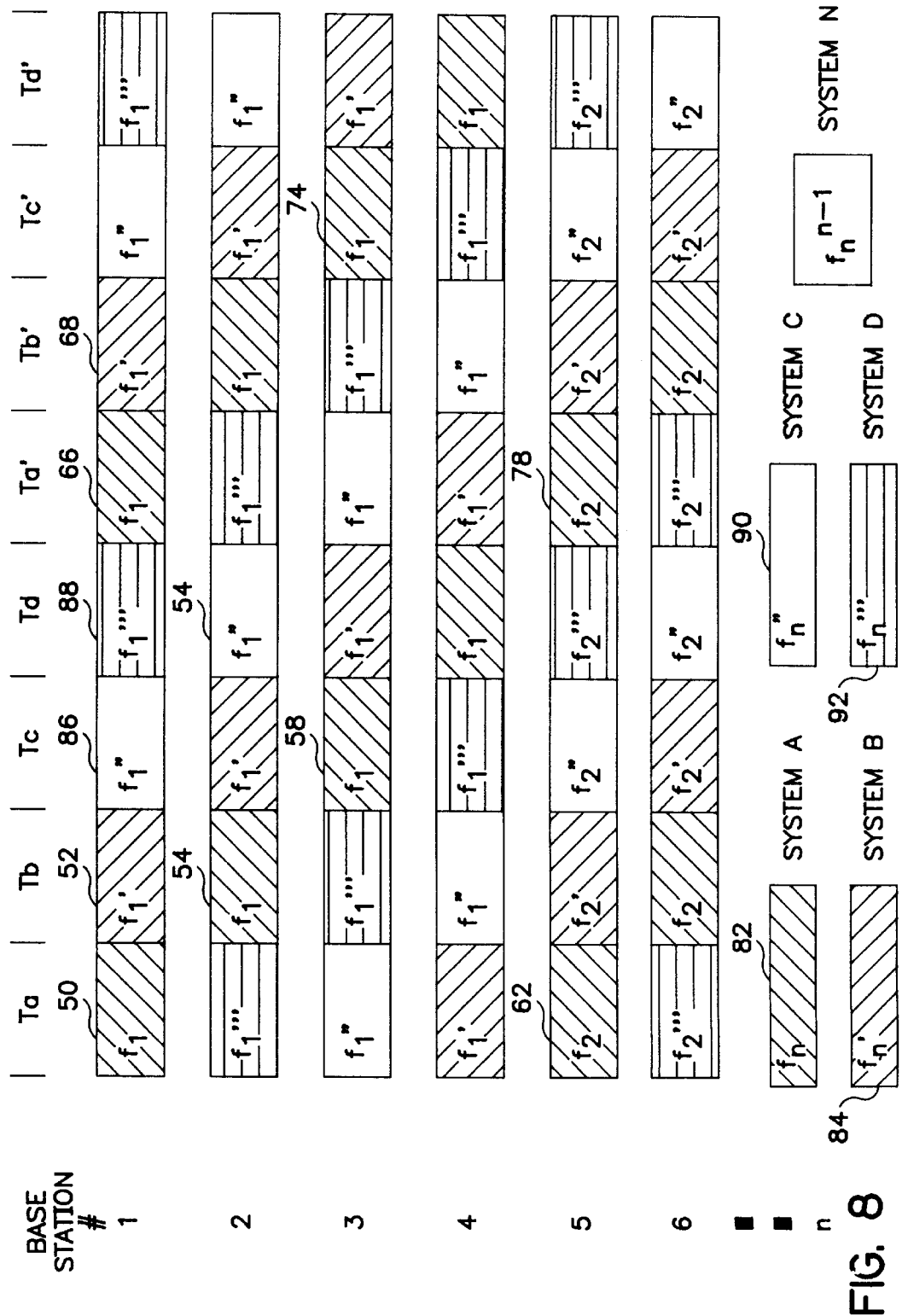
FIG. 8 is a timing diagram showing equal time slot allocations between n potentially interfering base stations, wherein the base stations are shared between four compatible radio communication systems.

The timing diagrams of FIGS. 4, 5 and 7 can all be extended to enable the base stations to support more than two radio communication systems. Using the inventive system-sharing technique of the present invention, the time-shared base stations can be shared between N additional radio communication systems, where N is limited only by the number of idle time slot periods. For example, the timing diagram of FIG. 8 shows time-sharing of a plurality of base stations between four compatible radio communication systems (i.e., N=4). More specifically, in the example shown, the base stations are time-shared between Systems A–D. A time-sharing factor of four is used to create four time periods, Ta, Tb, Tc, and Td. Each system uses at least two distinct frequencies ($f_1$ and $f_2$ for System A, $f_1'$ and $f_2'$ for System B, $f_1''$ and $f_2''$ for System C, and $f_1'''$ and $f_2'''$ for System D) assigned thereto. Each frequency of each system has a corresponding, yet distinct, frequency assigned to another system. Similar to the time allocation scheme shown in FIG. 7, the transmission periods for activation and de-activation of base station transmissions in each system are aligned in time.

As shown in FIG. 8, a base station that transmits on frequency $f_1$ in System A during one time period is allowed to transmit on a corresponding frequency $f_1'$ in System B during the next time period, and on corresponding frequencies $f_1''$ (in System C) and $f_1'''$ (in System D) during sequential time periods. For example, as shown in FIG. 8, the first base station transmits on frequency $f_1'$ 50 in System A during time period Ta. The base station then transmits on a distinct frequency $f_1'$ 52 in System B during the next time period Tb. During time period Tc, the base station transmits on corresponding frequency $f_1''$ 86 in System C, and then on frequency $f_1'''$ 88 in System D during the time period Td. The pattern repeats again as shown during the time period Ta'.

Base stations 2–4 follow a similar pattern using the frequencies $f_1$, $f_1'$, $f_1''$, and $f_1'''$.

Similarly, a base station (e.g., base stations 5–8 in FIG. 8) that transmits oil frequency $f_2$ in System A during one time period is allowed to transmit on a corresponding frequency $f_2'$ in System B during the next time period, a corresponding frequency $f_2''$ in System C during the next sequential time period, and on a distinct yet corresponding frequency $f_2'''$ during the next sequential time period. Each base station similarly transmits on corresponding frequencies of the four systems during subsequent time periods as shown in FIG. 8. More corresponding frequencies can be added to the time slot allocation shown as the number of base stations utilized by the compatible systems increases (e.g., corresponding frequencies $f_3$, $f_3'$ $f_3'''$ and $f_3'''$ can be added to Systems A–D respectively if the number of base stations utilized exceeds eight). There is no theoretical limit to the number of corresponding frequencies ($f_n$ for System A, $f_n'$ for System B, $f_n''$ for System C, and $f_n'''$ for System D) that can be used in practicing the present invention. Also, more compatible systems can be added provided that there are a sufficient number of time slots available for transmission therein.

Figure 9:
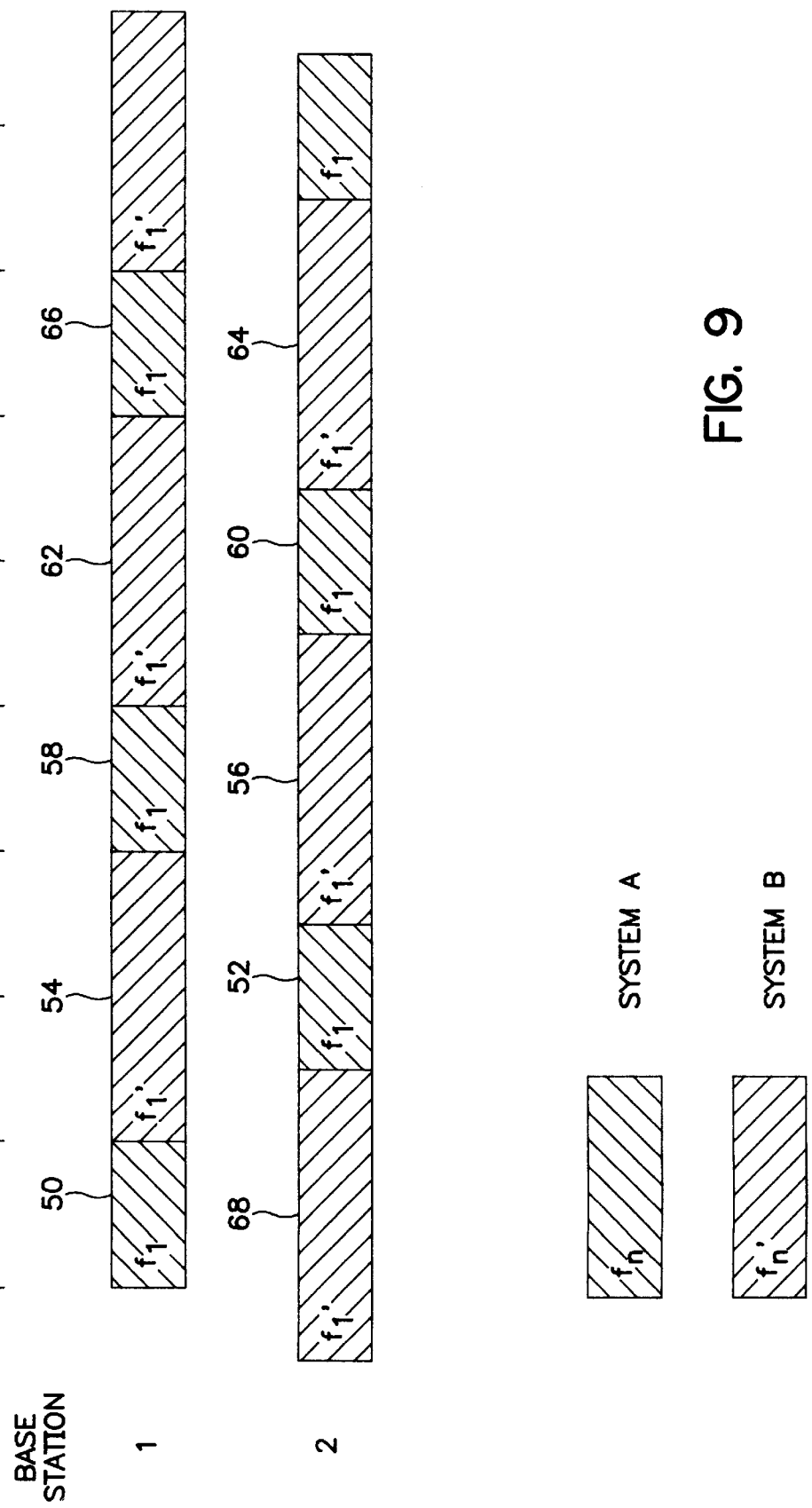
FIG. 9 is a timing diagram showing unequal time slot allocations between two potentially interfering base stations wherein the transmissions of the base stations overlap each other.

Many different time slot allocation schemes are possible using the present invention. For example, the present invention can be used in systems having compatible frequency plans wherein the base station transmission periods overlap. Such a compatible overlapping frequency transmission scheme is shown in FIG. 9. The time slot allocation scheme shown in FIG. 9 is similar to that of FIGS. 5–7 in that the two systems use complimentary frequency plans wherein the transmissions from each base station are offset from each other in time. However, FIG. 9 differs from FIGS. 5–7 because the transmission periods of the time-shared base stations overlap each other.

As shown in FIG. 9, a first base station 1 is activated to transmit on a first frequency $f_1$ in a first radio communication system A during the time periods Ta and Td. In accordance with the novel technique of the present invention, base station 1 can be activated to transmit on a second frequency $f_1'$ 54 in a second radio communication system B during the time periods that base station 1 is de-activated in system A (i.e., during the time periods Tb and Tc). A second base station 2 can be activated to transmit on the same first frequency $f_1$ in the same system A during portions of the time periods Tb and Tc as shown. Base station 2 can be activated to transmit on the same second frequency $f_1'$ 56 in the same second radio communication system B during the time periods that base station Y is de-activated in system A (i.e., during portions of Te, Td, and Ta').

There are times when the base stations transmission periods overlap. For example, base station 2 transmits on frequency $f_1'$ during portions of time periods Tc, all of time period Td, and portions of time period Ta'. As shown in FIG. 9, the first base station 1 also transmits on frequency $f_1'$ during the entirety of time periods Tc and Ta'. Thus, the base stations have overlapping transmission periods during the portions of the time periods Tc and Ta' that base station 2 is transmitting on frequency $f_1'$. Mobile units will therefore have exclusive use of a frequency channel during part of the time and will have to contend for a frequency channel during part of the time (i.e., where the base station transmissions overlap). The time slot allocation scheme shown in FIG. 9 can be extended to systems having three or more base stations using overlapping transmission period allocations.

Figure 10:
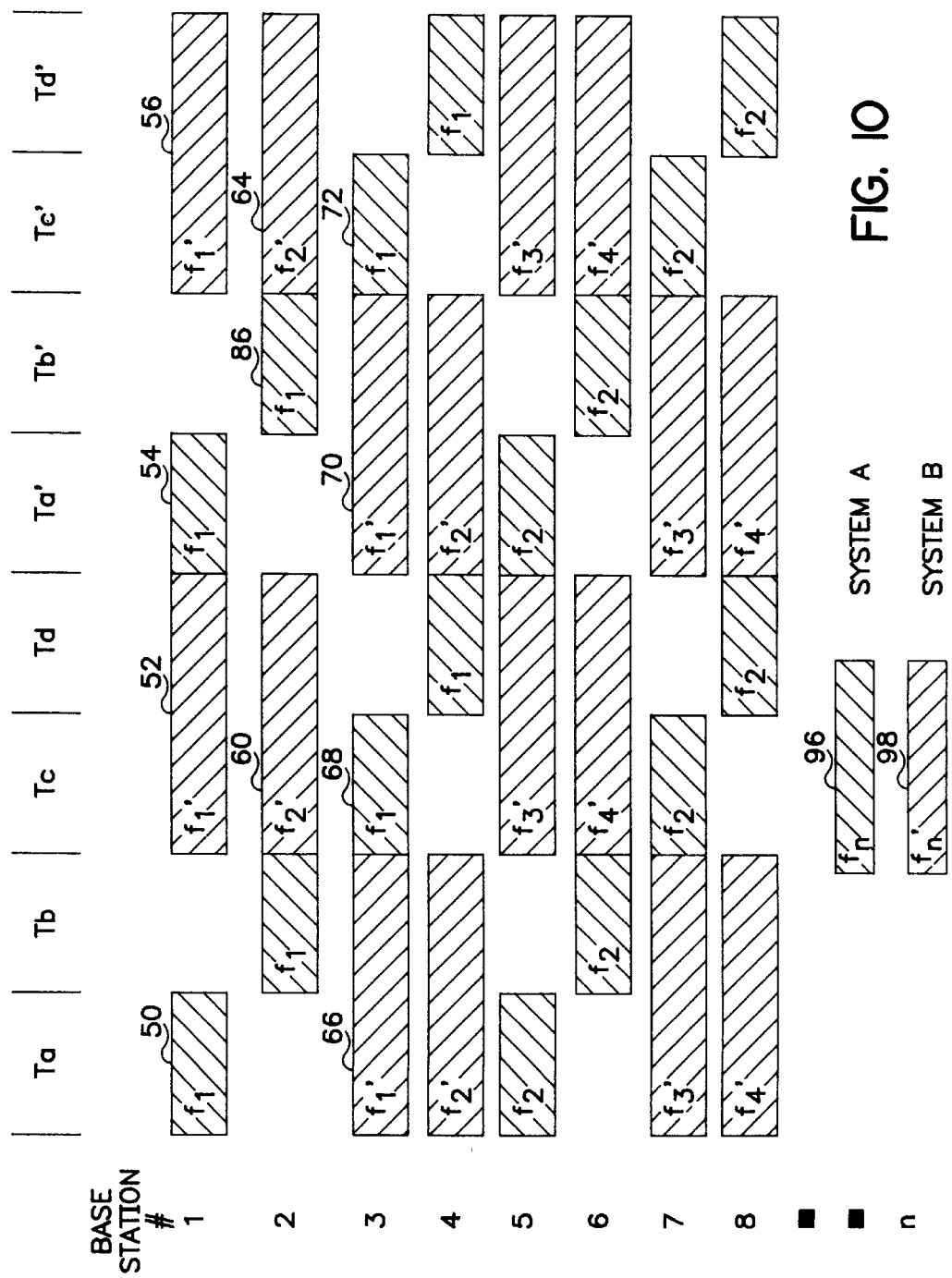
FIG. 10 is a timing diagram showing time slot allocations between a plurality of potentially interfering base stations serving two systems that have different frequency assignments and different transmission period durations.

There are other alternative time slot allocations that can be used in practicing the present inventive method. As described above, the present invention does not require that each radio communication system have a set of corresponding frequencies. Rather, the only requirement of the present invention is that the differing systems use compatible frequency plans. In fact, it is possible to use the present invention in systems using a different number of frequencies and having differing, yet compatible, transmission period durations. One example of such a time slot allocation scheme is shown in FIG. 10. Here, one set of base stations serve two systems that have different frequency assignments using different transmission period durations.

As shown in FIG. 10, System A uses two frequencies $f_1$ and $f_2$, while System B uses four frequencies $f_1'$, $f_2'$, $f_3'$, and $f_4'$. In addition, the number of time slots allocated to each transmission period varies between systems. For example, System A uses one time slot (e.g., Ta) for each transmission period (e.g., the first base station transmits on frequency $f_1$ 50 and 54 during time slots Ta and Ta', respectively) while System B uses two time slots for each transmission period (e.g., the first base station transmits on frequency $f_1'$ 52 during the entire transmission period comprising the time periods Tc and Td combined). More frequencies can be added to the time slot allocation diagram of FIG. 10 as the number of base stations increases. An analogous time slot allocation diagram can be used in an arrangement where System A has three assigned frequencies time-shared between four time slots and System B has six assigned frequencies time-shared between two time slots. Thus, the present inventive technique can be used to time-share base stations between compatible radio communication systems having differing numbers of assigned frequencies multiplexed using differing transmission periods. As described above with reference to FIG. 8, the present invention can be extended to support N distinct radio communication systems. Thus, the timing diagram of FIG. 10 can be modified to support more than two radio communication systems.

A primary benefit of the efficient technique described above with reference to FIGS. 4–10 is that one set of base stations previously installed to support a single time-sharing radio communication system can serve a plurality of systems without any adverse performance impact. Using otherwise idle cells or base stations for communication in multiple radio systems provides significant cost benefits for system providers. The cost savings are realized because multiple sets of base stations are not required to support multiple communication systems. Rather, newly added radio communication systems can be deployed in an area using existing time-shared base stations.

The time-sharing and system-sharing technique described above allows design of cell systems with many reuse patterns. Careful allocation of reused frequencies and time slot durations results in particular cell reuse patterns that provide good operational characteristics and low co-channel interference. In general, it is desirable (but not necessary) to have clusters or cell groups be approximately circular. In addition, optimal reuse patterns can generally be determined by applying two rules of thumb: first, equally spacing co-channel interferers as far apart as possible among all cells (not just those in one cell group) to minimize co-channel interference, and second, placing adjacent channel interferers (i.e., those cells using adjacent frequencies at the same time) in non-adjacent cells (this may not be possible for small cell groups) to minimize adjacent channel interference.

In summary, the invention includes a method and apparatus for system sharing time-shared base stations to support multiple distinct radio communication systems. Frequencies are re-used in a cellular communication system by allocating identical frequencies to neighboring cells in a cellular system within significant co-channel interference range of each other, and periodically enabling each such neighboring cell to transmit at least in part only during a time slot in which no other of such neighboring cells is activated. The preferred embodiment of the present invention time-shares base stations between at least two radio communication systems. Base stations that are periodically disabled in a first communication system are periodically enabled to transmit in one or more additional systems. Although the communication systems must use compatible frequency plans, the systems can use different numbers of frequencies and different transmission periods.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for sharing a plurality of base stations for communicating within cells using a first cellular communication system using first assigned carrier frequencies and a second cellular communication system using second assigned carrier frequencies each carrier frequency representing a communication channel, wherein a plurality of cells are arranged as a plurality of cell groups each cell having an assigned carrier frequency of the first and second assigned carrier frequencies, wherein selected base stations in a respective cell group are periodically activated to transceive on the first assigned carrier frequencies in the first communication system at least in part only during a time period in which no other selected base station in the respective cell group is so activated to transceive on the first carrier assigned frequencies, the method comprising:

(a) assigning the second assigned carrier frequencies of the second communication system to the selected base stations to share the selected base stations with the second communication system;

(b) periodically activating other base stations within the respective cell group to transceive on the second assigned carrier frequencies in the second communication system at least in part when the selected base stations in the respective cell group are activated to transceive on the first assigned carrier frequencies, and (c) periodically activating each selected base station within the respective cell group to transceive on the second assigned carrier frequencies in the second communication system during periods that the selected base stations would otherwise be idle in the first communication system at least in part only during a time period in which no other selected base station in the respective group is so activated to transceive on the second assigned carrier frequencies.

2. The method of claim 1 wherein the time period during which a selected base station is activated to transceive on the first assigned carrier frequencies has the same duration for another selected base station.

3. The method of claim 1 wherein the time period during which a selected base station is activated to transceive on the first assigned carrier frequencies has a different duration from another selected base station.

4. The method of claim 1 wherein the time period during which a selected base station is activated to transceive on the first assigned carrier frequencies has the same time period as that during which a selected base station is activated to transceive on the second assigned carrier frequencies.

5. The method of claim 1 wherein the time period during which a selected base station is activated to transceive on the first assigned carrier frequencies has a different duration than the time period during which a selected base station is activated to transceive on the second assigned carrier frequencies.

6. The method of claim 1 wherein the time period during which a selected base station is activated to transceive on the first assigned carrier frequencies does not overlap any time period during which a selected base station is activated to transceive on the second assigned carrier frequencies.

7. The method of claim 1 wherein the time period during which a selected base station is activated to transceive on the first assigned carrier frequencies at least partially overlaps the time period during which at least another selected base station is activated to transceive on the second assigned carrier frequencies.

8. A method for sharing a base station between a first radio communication system having a first set of assigned carrier frequencies and at least one additional radio communication system having a second set of assigned carrier frequencies each carrier frequency representing a communication channel, wherein the first radio communication system and the at least one additional radio communication system are time-shared cellular communication systems for sharing the base station, wherein the base station for sharing is periodically activated to communicate for a time period on a first carrier frequency in the first communication system, and wherein the base station is periodically idle in the first communication system during another time period, the method comprising:

(a) periodically activating another base station for sharing to communicate for another time period on the first carrier frequency in the first communication system, and wherein the another base station is periodically idle in the first communication system; and (b) selectively activating the base station for sharing to communicate on a second carrier frequency associated with the at least one additional radio communication system during time periods in which the base station is idle on the first carrier frequency in the first communication system.

9. The method of claim 8 wherein the time period during which the base station is activated to communicate in the first communication system has substantially the same duration as the time period during which the base station is activated to communicate in another communication system.

10. The method of claim wherein the time period during which the base station is activated to communicate in the first communication system is different from the time period during which the base station is activated to communicate with another communication system.

11. A method for sharing a plurality of base stations between a first radio communication system having a first assigned carrier frequency and one or more additional radio communication systems having additional assigned carrier frequencies in a time-shared cellular communication system having a plurality of cell groups, each of the carrier frequencies representing a communication channel, wherein each selected base station in a cell group is periodically activated to transceive on a first carrier frequency in the first radio communication system at least in part only during a time period in which no other selected base station in the cell group is so activated, comprising:

(a) assigning to a selected base station one or more of the additional carrier frequencies associated with the one or more additional radio communication systems wherein the additional carrier frequencies are distinct from each other and from the first carrier frequency; and (b) selectively activating selected base stations to transceive on a selected one of the one or more additional carrier frequencies in a selected additional communication system during periods that a base station is idle in the first system.

12. A method for sharing a plurality of base stations between a first radio communication system having a first set of assigned carrier frequencies and one or more additional radio communication systems having additional sets of assigned carrier frequencies in a time-shared cellular communication system having a plurality of cell groups, each of the carrier frequencies representing a communication channel, wherein selected base stations in a cell group are activated to transceive on a first set of distinct carrier frequencies in the first radio communication system when no other selected base station in the cell group is so activated, comprising:

a) assigning to a selected base station one or more of the additional sets of carrier frequencies associated with the one or more additional radio communication systems wherein the additional sets of carrier frequencies are distinct from each other and from the first set of carrier frequencies; and b) selectively activating the selected base stations to transceive on a selected set of the additional sets of carrier frequencies in selected corresponding additional communication systems when the base stations are idle in the first system.

13. A multiple cellular communication system having a plurality of cell groups and compatible frequency plans, comprising:

a) a first radio communication system having a first set of carrier frequencies for communication, each carrier frequency of the first set of carrier frequencies representing a communication channel for communication to at least one user;

b) at least one additional radio communication system having at least one set of additional carrier frequencies for communication, each additional set of carrier frequencies for communication being unique, each frequency of each additional set of carrier frequencies representing a communication channel for communication to at least one other user; and c) a plurality of base stations arranged into respective cell groups, wherein selected base stations in a respective cell group are activated to communicate for a first time period on a carrier frequency of the first set of carrier frequencies of the first radio communication system when no other base station in the corresponding cell group is activated to communicate on the carrier frequency of the first set of carrier frequencies of the first radio communication system, and wherein the selected base stations are activated to communicate on a selected carrier frequency of the at least one set of additional carrier frequencies when the selected base stations are idle in the first system.

14. The cellular communication system of claim 13, wherein the time period during which the selected base stations are activated to communicate in the first communication system has substantially the same duration as the time period during which the base stations are activated to communicate in an additional communication system.

15. The cellular communication system of claim 13, wherein the time period during which a base station is activated to communicate in the first communication system has a different duration from the time period during which a base station is activated to communicate in another communication system.

16. A method of adding a base sharing cellular communication system on top of a pre-existing cellular communication system, the method comprising:

a) providing the pre-existing cellular communication system having base stations time-synchronized and configured to communicate in accordance with a predetermined time slot allocation scheme on a first set of carrier frequencies, the pre-existing cellular communication system having idle periods of communication on the first set of carrier frequencies at base stations;

b) providing at least one base sharing cellular communication system configured to communicate in another predetermined time slot allocation scheme on a second set of carrier frequencies over the base stations of the pre-existing cellular communication system; and, c) the at least one base sharing cellular communication system communicating in the another predetermined time slot allocation scheme over the base stations of the pre-existing cellular communication system during idle periods of communication on the first set of carrier frequencies, the communication using the second set of carrier frequencies.

17. The method of claim 16, wherein, the at least one base sharing cellular communication system has a complementary frequency plan offset from the pre-existing and the other base sharing cellular communication systems both in time and frequency.

18. The method of claim 16, wherein, the idle periods of communication on the first set of carrier frequencies in the first cellular communication system is greater than the predetermined time slot allocation for communication on the second set of carrier frequencies.

19. The method of claim 16, wherein, the at least one base sharing communication system is added to provide a different type of communication between the shared base station and a different mobile unit capable of communicating over the second set of carrier frequencies.

20. The method of claim 16, wherein, the at least one base sharing communication system is added to provide additional communication capacity for communication to additional users using a similar type of communication between the shared base station and a mobile unit capable of communicating over only the second set of carrier frequencies.

21. The method of claim 16, wherein, the at least one base sharing communication system is added to provide additional communication capacity for communication to additional users using a similar type of communication between the shared base station and a mobile unit capable of communicating over either the first set of carrier frequencies or the second set of carrier frequencies but using only one carrier frequency for communication at a time unless a handoff is necessary.

22. The method of claim 16, further comprising:

(d) providing another base sharing cellular communication system configured to communicate in yet another predetermined time slot allocation scheme on a third set of carrier frequencies over the base stations of the pre-existing cellular communication system; and, (e) the another base sharing cellular communication system communicating in the yet another predetermined time slot allocation scheme over the base stations of the pre-existing cellular communication system during idle periods of communication on the first set of carrier frequencies and idle periods of communication on the second set of carrier frequencies at shared base stations, the communication of the another base sharing system to mobile units using the third set of carrier frequencies.

\* \* \* \* \*

UNITED STATES PATENT AND TRADEMARK OFFICE
CERTIFICATE OF CORRECTION

PATENT NO. : 5,999,818
DATED : December 7, 1999
INVENTOR(S) : Gilbert et al.

It is certified that errors appear in the above-identified patent and that said Letters Patent is hereby corrected as shown below:

In column 6, line 12, delete "during the time period Th," and insert -- during the time period Tb, --.

In column 6, line 24, delete "time periods Ta, Tb, Te, and Td." and insert -- time periods Ta, Tb, Tc, and Td. --.

In column 8, line 19, delete "frequency $f_2$'" and insert -- frequency $f_2$ --.

In column 8, line 28, delete "frequencies $f_3$ and $f_4$'" and insert -- frequencies $f_3$ and $f_3'$ --.

In column 8, line 61, delete "frequency $f_1$'50" and insert -- frequency $f_1$ 50 --.

In column 9, line 4, delete "that transmits oil frequency" and insert -- that transmits on frequency --.

UNITED STATES PATENT AND TRADEMARK OFFICE
CERTIFICATE OF CORRECTION

PATENT NO. : 5,999,818
DATED : December 7, 1999      PAGE 2 OF 2
INVENTOR(S) : Gilbert et al.

It is certified that errors appear in the above-identified patent and that said Letters Patent is hereby corrected as shown below:

In column 9, line 15, delete "frequencies $f_3$, $f_3'$ $f_3'''$ and $f_3''''$" and insert -- frequencies $f_3$, $f_3'$, $f_3''$, and $f_3'''$ -- .

In column 9, line 49, delete "during portions of Te, Td, and Ta')." and insert -- during portions of Tc, Td, and Ta'). -- .

In column 12, line 50, delete "The method of claim wherein" and insert -- The method of claim 8 wherein -- .

Signed and Sealed this

Fifth Day of September, 2000

*Attest:*

Q. TODD DICKINSON

*Attesting Officer*      *Director of Patents and Trademarks*